United States Patent [19]
Westra

[11] 3,898,559
[45] Aug. 5, 1975

[54] METHOD AND APPARATUS FOR TESTING TRANSISTORS

[75] Inventor: Marlin D. Westra, Sioux Falls, S. Dak.

[73] Assignee: Sencore Incorporated, Sioux Falls, S. Dak.

[22] Filed: Feb. 5, 1973

[21] Appl. No.: 329,639

[52] U.S. Cl. .................... 324/158 T; 324/83 A
[51] Int. Cl. ................ G01r 31/22; G01r 25/00
[58] Field of Search .................... 324/158 T, 324/57 R, 73 R, 83 A

[56] References Cited
UNITED STATES PATENTS

| | | | |
|---|---|---|---|
| 2,213,099 | 8/1940 | Adorjan | 324/57 R |
| 2,942,182 | 6/1960 | Kramer | 324/57 R |
| 3,153,759 | 10/1964 | Yagyu | 324/158 T |
| 3,328,688 | 6/1967 | Brooks | 324/83 A |
| 3,403,339 | 9/1968 | Nishida et al. | 324/158 T |
| 3,636,443 | 1/1972 | Singh et al. | 324/73 R |
| 3,671,876 | 6/1972 | Oshiro | 324/83 D |

OTHER PUBLICATIONS

Crowhurst, N. H.; "Checking Hi-Fi Amplifiers;" Audio-High Fidelity; Dec. 1958; pg. 45–48.

Primary Examiner—Alfred E. Smith
Assistant Examiner—Ernest F. Karlsen
Attorney, Agent, or Firm—Edmond T. Patnaude

[57] ABSTRACT

Bipolar and field effect transistors are tested by means of a single circuit employing an exclusive-or logic block which provides an output signal when the collector signal is out of phase with the base signal on a bipolar transistor or when the drain signal is out of phase with the gate signal on a field effect transistor.

5 Claims, 1 Drawing Figure

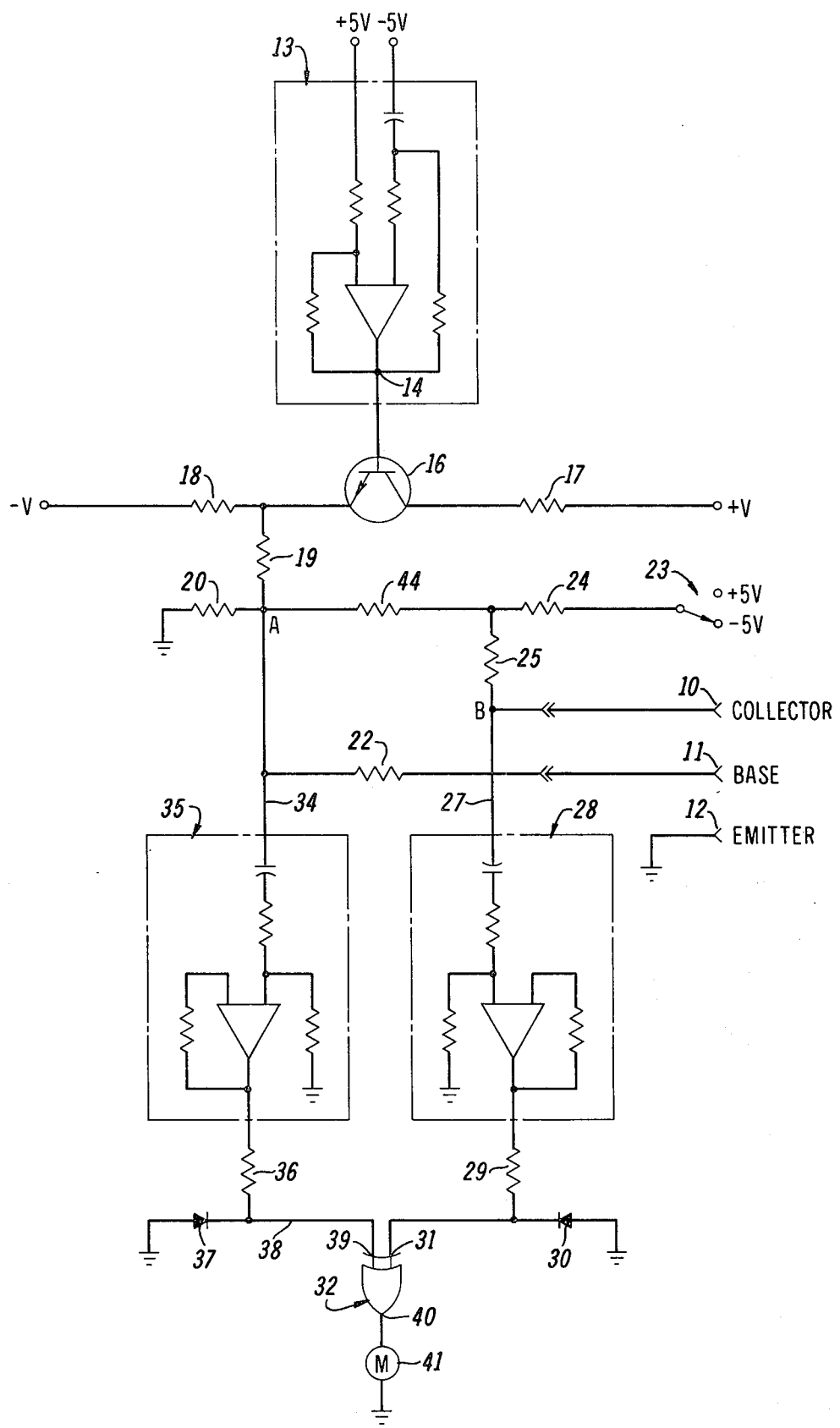

METHOD AND APPARATUS FOR TESTING TRANSISTORS

The present invention relates in general to transistor testing, and it relates more particularly to a new and improved method and circuit for testing both bipolar and field effect transistors.

BACKGROUND OF THE INVENTION

In the prior art, bipolar transistors have usually been tested for gain by setting one of the base and collector currents and comparing it with the other. One such testing system is described in copending application Ser. No. 227,942, filed Feb. 22, 1972 now U.S. Pat. No. 3,832,633 by Ralph H. Bowden, and assigned to the same assignee as the present invention and utilizes a variable control to set up a calibrated current level in the emitter and switching means for switching a meter from the emitter to the base and thereby measuring the base current. While this method and circuit provides an accurate measurement of the beta of a bipolar transistor it cannot be used for testing field effect transistors, FETs, since such transistors inherently have no gain. Accordingly, separate circuitry has been required for testing field effect transistors.

OBJECTS OF THE INVENTION

Therefore, a principal object of the present invention is to provide a new and improved method and circuit for use in testing both bipolar and field effect transistors.

Another object of the present invention is to provide a new and improved method and circuit for use by nontechnical personnel to indicate whether a transistor is "good" or "bad," and which can be used whether or not the transistor is connected in circuit with other components.

A further object of this invention is to provide a method and circuit for simply indicating whether a transistor is good or bad and which will not provide a good reading if the transistor under test is improperly connected in the test circuit.

SUMMARY OF THE INVENTION

Briefly, the above and further objects may be realized in accordance with the present invention by supplying an alternating current signal to the base or gate of the transistor to be tested, and coupling the corresponding collector or drain signal to one input of an exclusive-or logic gate while applying the base or gate signal to the other input whereby an output signal is generated only when the base or gate signal is out of phase with its corresponding collector or drain signal thereby indicating if the transistor is operative.

BRIEF DISCRIPTION OF THE DRAWING

Further objects and advantages and a better understanding of the invention may be had from the following detailed description taken in connection with the accompanying drawing, wherein:

The single FIGURE of the drawing is a schematic circuit diagram of a transistor test circuit embodying the present invention.

DETAILED DESCRIPTION OF THE INVENTION

Referring now to the drawing, a plurality of terminal connectors 10, 11 and 12 are provided for connection to the electrodes of a transistor to be tested. The connector 10 is adapted to be connected to the collector electrode of a bipolar transistor or to the drain electrode of a field effect transistor. The connector 11 is adapated to be connected to the base electrode of a bipolar transistor or to the gate electrode of a field effect transistor. The connector 12, which is grounded, is adapted to be connected to the emitter of a bipolar transistor or to the source electrode of a field effect transistor.

A conventional oscillator 13 provides a 1000 Hz square wave output at the terminal 14 which is coupled to the base of a transistor 16 connected in an emitter follower circuit including a collector resistor 17 and an emitter resistor 18. The emitter follower provides a low impedance drive for the transistor under test, and the resistance value of the resistor 17 is chosen to center the square wave at the emitter relative to ground. A voltage divider made up of a pair of resistors 19 and 20 is connected between the emitter of the transistor 16 and ground to provide a 3-volt peak-to-peak square wave at the junction of the resistors 19 and 20 and at the terminal connector 11.

The collector or drain of the transistor being tested is supplied with a D.C. bias voltage from a suitable source of D.C. voltage through a single-pole double-throw switch 23 and a pair of resistors 24 and 25 connected in series between the switch 23 and the terminal connector 10. As is explained more fully hereinafter, in one position of the switch 23 a positive bias voltage is connected to the terminal connector 10 for testing an NPN bipolar transistor or an N-channel field effect transistor and in the other position of the switch 23 a negative bias voltage is connected to the terminal connector 10 for testing a PNP bipolar transistor or a P-channel field effect transistor.

Assuming an operative transistor is being tested, a 1000 Hz square wave will be developed at the collector or drain terminal 10 and this signal is coupled by a conductor 27 to an amplifier 28 which feeds a clipper circuit including a resistor 29 and a diode 30. The output signal from the clipper is taken from across the diode 30 and is coupled to one input terminal 31 of an exclusive-or logic gate 32. In like manner the base or gate signal is coupled through a conductor 34 to an amplifier 35 which feeds a clipper circuit including a resistor 36 and a diode 37. The output signal from this clipper is coupled by a conductor 38 to the other input terminal 39 of the exclusive-or circuit 32. If the signals appearing at the input terminals 31 and 39 are out of phase, a signal will be developed between the output terminal 40 and ground. Any signal indicating device such as a meter, a lamp bulb or the like may be used to provide a visible or audible indication when a signal appears at terminal 40 signifying a "good" transistor. As shown, a meter 41 is connected between the terminal 40 and ground for this purpose.

Inasmuch as the drain signal of a field effect transistor has a lower amplitude than the gate input signal, the amplifier 28 has a greater gain than the amplifier 35 to provide an input signal of sufficient amplitude at the terminal 31 to drive the exclusive-or logic gate 32. Although not critical, amplifier 28 has a gain of fifteen while amplifier 35 has a gain of 10.

In order to prevent a partial signal from appearing at the output terminal 40 of the logic gate 32 when a "bad" transistor or no transistor at all is connected to the terminal connectors 10, 11 and 12, a resistor 44 is connected between the junction of resistors 19 and 20 and the junction between the resistors 24 and 25. The resistor 44 thus couples a portion of the square wave drive signal to amplifier 28 and assures that no output signal is developed at the logic gate output 40 until the collector or drain current signal at the terminal 10 is in excess of this in-phase bias signal. In practice, it has been found that an in-phase signal having an amplitude equal to one-tenth of the drive signal prevents erroneous readings.

OPERATION

In use, a transistor to be tested is connected to the terminal conectors 10, 11 and 12 and the switch 23 is positioned to provide either a positive or negative D.C. bias voltage at the collector or drain of the transistor. A square wave drive signal toggling between ±1.5 volts appears across resistor 20 and is coupled by resistor 22 to the base or gate of the transistor under test. This square wave drive signal is also coupled by the conductor 34 to the amplifier 35. Assuming a good transistor, a square wave signal of the same frequency but 180° out of phase will be developed at the collector or drain of the transistor and coupled by the conductor 27 to the amplifier 28. The exclusive-or logic gate is thus driven by two signals of equal frequency and opposite phase and provides an output signal indicated by the meter 41. If, on the other hand, the transistor under test is inoperative, the signal at connector terminal 10 will be in-phase with the drive signal wherefore the logic gate 32 will be driven by two signals of the same phase and frequency and will not conduct wherefore no current will flow through the meter 41 thus signifying a "bad" or inoperative transistor.

It may thus be seen that the present invention provides a fast and easy method of testing either bipolar or field effect transistors of either polarity by means of the same circuit. While this method and circuit is not intended to accurately measure the gain of bipolar transistors, in most cases a serviceman is primarily interested in determining whether a transistor is functioning at all and in making such determination quickly. This method and circuit thus fulfills his needs in the vast majority of instances.

While the particular circuit parameters are not critical, it has been found that the following component values provide a good operating circuit for testing both bipolar transistors and FETs:

| | |
|---|---|
| Transistor 16 | 2N5172 |
| Resistor 17 | 68 ohms |
| Resistor 18 | 220 ohms |
| Resistor 19 | 47 ohms |
| Resistor 20 | 100 ohms |
| Resistor 22 | 220 ohms |
| Resistor 24 | 220 ohms |
| Resistor 25 | 220 ohms |
| Resistor 44 | 2.2 kilohms |

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A circuit for testing bipolar and field effect transistors, comprising
    a first terminal connector for connection to the collector of a bipolar transistor or to the drain of a field effect transistor,
    a second terminal connector for connection to the base of a bipolar transistor or to the gate of a field effect transistor,
    a third terminal connector for connection to the emitter of a bipolar transistor or to the source of a field effect transistor,
    an oscillator having an a square wave output,
    means coupling the output of said oscillator to said second terminal connector, and
    means including an exclusive-or logic gate responsive to the relative phase relationship of the A.C. signals at said first and second terminal connectors to indicate when said signals are 180° out-of-phase, thereby to signify that an operative bipolar or field effect transistor is connected to said terminal connectors.

2. A circuit according to claim 1 wherein said last named means comprises
    first and second amplifiers each having an input connected to a respective one of said first and second terminal connectors, and
    said an exclusive-or logic gate has a pair of inputs respectively coupled to the outputs of said amplifiers.

3. A circuit according to claim 1, comprising
    means coupling an in-phase portion of said square wave output of said oscillator to first terminal connector.

4. A method of testing a transistor comprising the steps of
    applying a square wave drive signal to one electrode of said transistor to develop on another electrode of said transistor a second signal having a frequency equal to that of said drive signal and 180° out-of-phase therewith when said transistor is operative, and
    utilizing a logic circuit to detect the 180° phase shift between said drive signal and said second signal to indicate that the transistor is operative.

5. A method according to claim 4 wherein said logic circuit is an exclusive-or logic circuit.

* * * * *